United States Patent [19]

Delpretti

[11] 4,306,136

[45] Dec. 15, 1981

[54] PROCESS AND APPARATUS FOR ELIMINATING SHORT CIRCUITS IN ELECTRICAL DISCHARGE MACHINING

[75] Inventor: Roger Delpretti, Vernier, Switzerland

[73] Assignee: Ateliers des Charmilles, S.A., Geneva, Switzerland

[21] Appl. No.: 109,471

[22] Filed: Jan. 4, 1980

Related U.S. Application Data

[63] Continuation of Ser. No. 878,568, Feb. 16, 1978, abandoned.

[30] Foreign Application Priority Data

Feb. 25, 1977 [CH] Switzerland ............... 2372/77

[51] Int. Cl.³ .............................................. B23P 1/02
[52] U.S. Cl. ................................ 219/69 P; 219/695; 219/69 C; 219/69 M
[58] Field of Search ................. 219/69 C, 69 P, 69 S, 219/69 M

[56] References Cited

U.S. PATENT DOCUMENTS

| | | | |
|---|---|---|---|
| Re. 29,589 | 3/1978 | Inoue | 219/69 C |
| 3,609,281 | 9/1971 | Kauffman | 219/69 M |
| 3,614,368 | 10/1971 | Lobur | 219/69 P |
| 3,832,511 | 8/1974 | Bell, Jr. et al. | 219/69 P |
| 3,916,138 | 10/1975 | Pfau | 219/69 C |
| 3,996,445 | 12/1976 | Wohlabaugh | 219/69 C |

*Primary Examiner*—C. C. Shaw
*Attorney, Agent, or Firm*—Hauke and Patalidis

[57] ABSTRACT

A process and apparatus for increasing the frequency of the effective machining electrical discharges between the electrode workpiece and the electrode tool of an EDM apparatus. The process of the invention consists in monitoring the electrical parameters in the machining zone between the electrodes such as to detect short circuits, and, when a short circuit is detected, in continuing monitoring the electrical parameters until monitoring indicates the disappearance of the short circuit, in cutting off the ongoing electrical discharge after a predetermined time interval following the moment at which said short circuit disappears and in re-establishing normal electrical voltage pulses after another time interval following the end of the discharge. The invention also provides appropriate apparatus for practicing the process.

6 Claims, 3 Drawing Figures

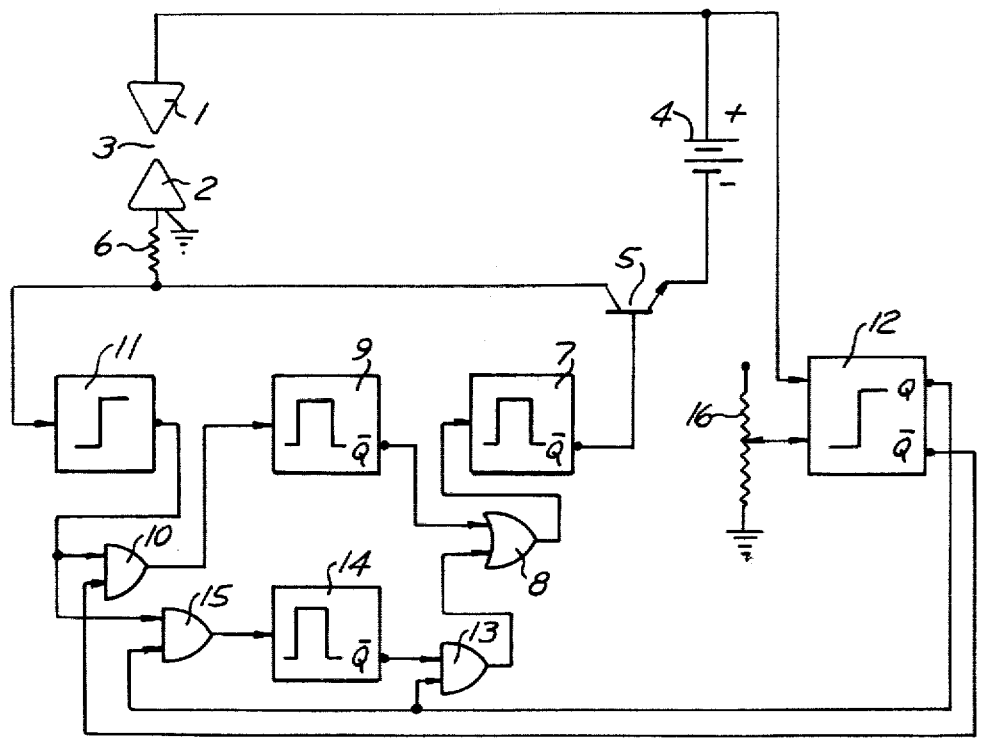
FIG. 1
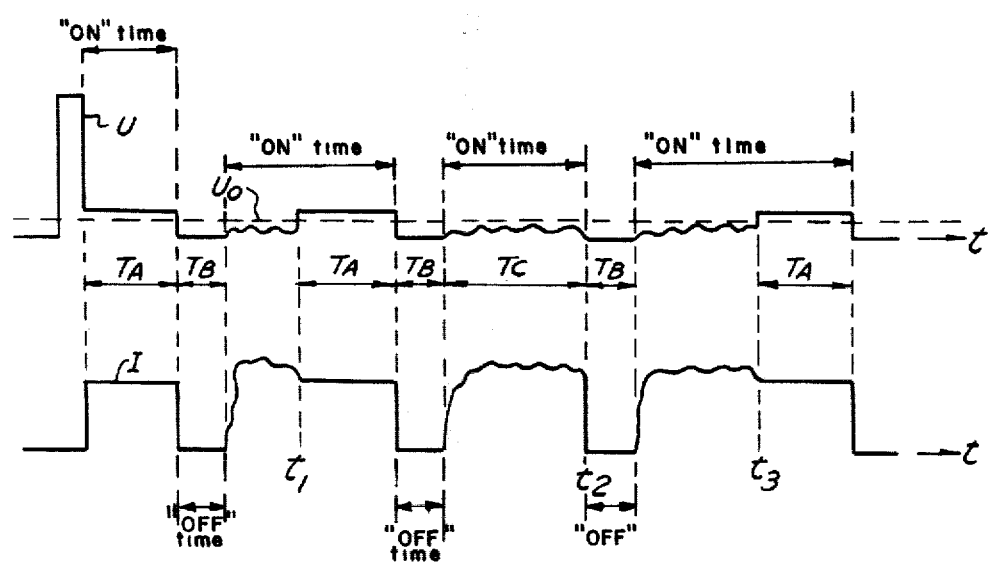

PROCESS AND APPARATUS FOR ELIMINATING SHORT CIRCUITS IN ELECTRICAL DISCHARGE MACHINING

This is a continuation of application Ser. No. 878,568, filed Feb. 16, 1978, now abandoned.

BACKGROUND OF THE INVENTION

The present invention relates to a process and apparatus fo machining an electrode workpiece by means of an electrode tool, wherein successive voltage pulses are applied across the electrodes for triggering machining electrical discharges, the voltage pulses being obtained by connecting across the electrodes a DC source after a first predetermined time interval following the end of an electrical discharge and disconnecting the source from across the electrodes after at least a second predetermined time interval following the beginning of an electrical discharge.

Pulse generators operating as indicated above are well known in EDM technology, and they are able to provide each voltage pulse with a predetermined duration from the moment at which a machining electrical discharge begins. Under such circumstances, the duration of each pulse is controlled independently of the delay time interval between the voltage pulse and the current pulse. It has been observed that when electrical discharges occur in the machining zone between the electrodes during an EDM operation, bridging of the electrodes by metallic particles may repeatedly be formed, thus causing short circuits between the electrodes and non-machining electrical discharges, especially during finish machining.

Because such short circuits not only decrease the machining efficiency, but they tend to degenerate into electrical arcs whose principal effect it is to damage the machined surfaces and the electrode tool, diverse methods have been developed in the past to eliminate the short circuits between the electrodes. However, it has been observed that, in the majority of cases, the metallic bridges between the electrodes are weak enough to spontaneously disppear by melting away as the result of the passage therethrough of a short circuit current during a single pulse and, therefore, the effective machining characteristics of the electrical discharge is reestablished in the course of that single pulse.

When machining is effected by means of conventional pulse generators as briefly described hereinbefore, and when a short circuit spontaneously disappears during a single pulse, the duration of the effective machining segment of the electrical discharge is considerably reduced and can even be nil when the short circuit disappears simultaneously with the end of the pulse. It is therefore necessary to wait uselessly until the beginning of the following pulse to trigger a new effective electrical discharge.

SUMMARY

The new process and apparatus of the invention have for principal object to remedy the inconveniences enumerated hereinbefore. The invention contemplates monitoring the electrical parameters in the machining zone during each electrical discharge to determine the accidental appearance of a short circuit and, in the event that a short circuit appears, to cut off the discharge after a predetermined delay time interval measured from the disappearance of the short circuit, such delay time interval being equal to the duration of an effective machining discharge.

The invention permits to control the pulses such as to increase the frequency of the effective machining electrical discharges and, consequently, it permits to improve the over-all machining efficiency. Another advantage of the invention is to produce electrical discharges which all have the same predetermined duration, even when some of the discharges start on a short circuit, with the result of obtaining an exacting control of the machined surface finish.

BRIEF DESCRIPTION OF THE DRAWING

In the attached drawing which illustrates, schematically and for illustrative purposes only, an apparatus for practicing the present invention:

FIG. 1 represents a schematic of an example of circuit for practicing the invention;

FIG. 2 is a wave diagram of the machining voltage and machining current resulting from using the circuit of FIG. 1.

DETAILED DESCRIPTION OF THE PREFERRED EMBODIMENTS

Figure 3:
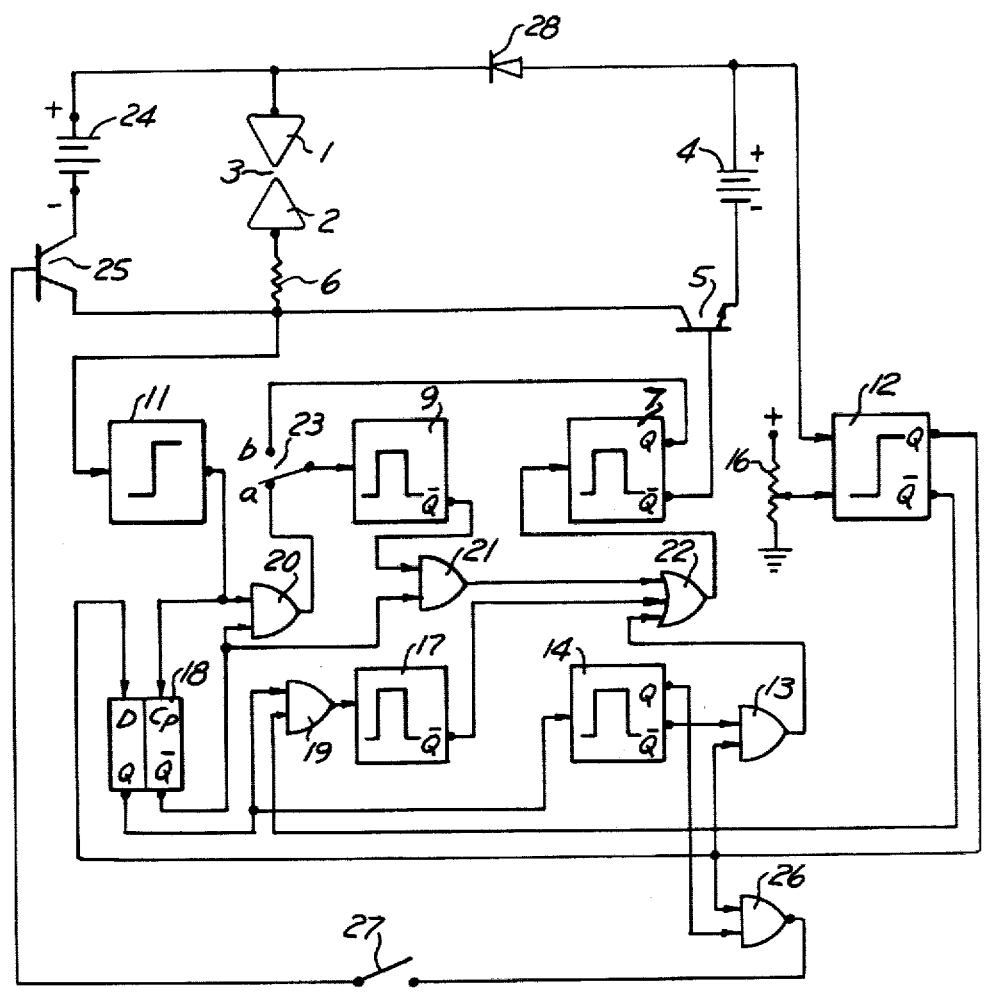
FIG. 3 is a second circuit schematic for practicing the invention.

As shown at FIG. 1 of the drawing, an electrode tool 1 and an electrode workpiece 2 separated by a gap forming a machining zone 3 are connected across a DC power supply 4 through the emitter-collector circuit of a transistor 5 and a resistor 6 limiting to a predetermined value the current intensity of the electrical discharges in the machining zone 3. The conductance of the transistor 5 is controlled by a signal at the output $\bar{Q}$ of a monostable multivibrator 7 whose input is connected to the output of an OR gate 8. One of the inputs of the OR gate 8 is connected to the output $\bar{Q}$ of another monostable multivibrator 9 whose input receives an output signal from an AND gate 10. One of the inputs of the AND gate 10 is connected to the output of a Schmitt trigger 11, and the other input of the AND gate 10 is connected to the output $\bar{Q}$ of another Schmitt trigger 12.

The other input of the OR gate 8 receives the output signal from an AND gate 13 having an input connected to the output $\bar{Q}$ of a monostable multivibrator 14 and its other input connected to the output Q of the Schmitt trigger 12. The monostable multivibrator 14 is controlled by a signal at the output of an AND gate 15 which has an input connected to the output of the Schmitt trigger 11 and another input connected to the output Q of the Schmitt trigger 12. The Schmitt trigger 12 is a double-trigger acting as a comparator comparing the machining voltage measured across the machining zone to a reference voltage provided by a potentiometer 16. The Schmitt trigger 12 detects any short circuit appearing in the machining zone 3 and provides a signal on its output Q as soon as the voltage amplitude of an electrical discharge is below the reference voltage obtained from the potentiometer 16.

In the absence of such signal, that is as long as the electrical discharges are normal, the AND gate 10 provides at its output the signal appearing at the output of the Schmitt trigger 11 as soon as machining current begins to circulate, thus causing a voltage drop to appear across the limiting resistor 6. The signal at the output of the AND gate 10 is applied to the input of the monostable multivibrator 9, switching the multivibrator 9 to its unstable mode for a period of time corresponding to the time duration of a discharge. As soon as the monostable multivibrator 9 returns to its stable state, the signal appearing at its output $\overline{Q}$ is applied through the OR gate 8 to the input of the monostable multivibrator 7, which in turn causes a signal appearing at the output $\overline{Q}$ of the monostable multivibrator 7 to be applied to the base of the transistor 5, cutting off the transistor and preventing the voltage of the DC source from being applied across the electrodes 1 and 2.

Under those conditions, the pulse generator heretofore described operates in the same manner as described for example, in U.S. Pat. No. 3,916,138. However, the circuit of FIG. 1 operates in a manner entirely different from that described in said patent when there is a short circuit occurring in the course of a discharge in the machining zone. In such case, the signal at the output $\overline{Q}$ of the comparator 12 inhibits the AND gate 10, and the signal at its output Q enables the AND gates 15 and 13 and thus causes a change in the state of the monostable multivibrator 14.

One of two possibilities may then be present. Either the short circuit disappears in the course of the time interval during which the monostable multivibrator 14 is in an unstable state or, in the alternative, the short circuit does not disappear during such time interval.

In the first case, as soon as the short circuit disappears, the signal at the output $\overline{Q}$ of the Schmitt trigger 12 is allowed to pass through the AND gate 10 and operates the monostable multivibrator 9, which results in increasing the duration of the pulse for a predetermined time duration from the moment at which the short circuit disappears. The monostable multivibrator 14, which has been controlled to its unstable state at the beginnings of the pulse, provides at its output Q a signal which is blocked by the AND gate 13 as soon as the short circuit disappears.

In the second case, that is when the short circuit does not disappear during the duration of the pulse or, in other words, when the short circuit is still present at the moment when the monostable multivibrator 14 returns to its stable state, the output $\overline{Q}$ of the multivibrator 14 provides a signal through the AND gate 13 and the OR gate 8 which changes the state of the monostable multivibrator 7 after a predetermined time interval following the beginning of the short circuited pulse. The duration of the current pulse in the presence of a short circuit is therefore limited to such time interval.

FIG. 2 is an illustrative wave diagram representing the results achieved by the process of the invention for typical voltage pulses and current pulses occurring during the operation of the apparatus of the circuit of FIG. 1. The first pulse occurs without short circuit and it can be seen that, under those conditions, the voltage pulse U causes a current pulse I to flow during the time interval TA, the voltage pulse U dropping to a lower amplitude as soon as the current pulse begins to flow.

After a cut-off time interval TB, or off time, the voltage pulse is re-established but if there is a short circuit in the machining zone the amplitude of the voltage pulse falls below the level Uo, Uo being the reference voltage established by the potentiometer 16 of FIG. 1. If it is assumed that the short circuit disappears at the time $t_1$, the voltage amplitude rises over the reference level Uo, and the current pulse continues during the time interval TA as controlled by the monostable multivibrator 9.

During the next voltage pulse, there is a new short circuit which does not disappear during the time interval TC, the time interval determined by the monostable multivibrator 14. The pulse is then interrupted at the time $t_2$ at the end of the time interval TC and is cut off again during the cut-off time interval TB. During the next voltage pulse, there is still a short circuit which disappears at the time $t_3$. As the voltage once again rises above Uo, there is a machining current pulse of duration TA which occurs thereafter.

It can thus be seen that in the course of four pulses, as illustrated at FIG. 2, the new process of the invention permits to obtain three effective machining discharges of equal duration TA, while, by contrast and by utilizing conventional electrical discharge machining techniques, only one effective machining discharge would have been obtained, which demonstrates clearly the advantages provided by the present invention.

It can be seen, as illustrated at FIG. 2, that the "off" time intervals TB are of constant or equal duration irrespective of whether or not a short circuit has appeared during the "on" time interval of application of voltage pulse across the electrodes. The "on" time intervals vary in duration as a function of the time interval elapsing prior to the occurrence of a current pulse of constant duration TA. However, the "on" interval, or durations of the voltage pulse, is limited to a predetermined time interval TC when the short circuit does not disappear during the "on" time interval.

FIG. 3 is a schematic circuit diagram of another example of an arrangement for practicing the invention, which comprises some of the same elements shown at FIG. 1 which are identified by the same reference numerals. The circuit of FIG. 3, in addition, comprises a monostable multivibrator 17 which permits to prolong the current pulse after the disappearance of a short circuit during a time interval different from the time interval during which a current pulse is applied across the machining zone in the absence of a short circuit. The signal at the output Q of the Schmitt trigger comparator 12 which detects the appearance of a short circuit, is applied to the input D of a flip-flop 18 whose other input Cp receives the output signal from the Schmitt trigger 11 which indicates that current is passing through the machining zone 3 between the electrode tool 1 and the electrode workpiece 2.

The output $\overline{Q}$ of the flip-flop 18 is connected to one of the inputs of an AND gate 20 and to one of the inputs of a second AND gate 21. The other output Q of the flip-flop 18 is connected to one of the inputs of an AND gate 19 and to the input of the monostable multivibrator 14. The other inputs of the AND gates 19, 20 and 21 are connected, respectively, to the output $\overline{Q}$ of the Schmitt trigger comparator 12, to the output of the Schmitt trigger 11 and to the output $\overline{Q}$ of the monostable multivibrator 9. The AND gate 20 controls the monostable multivibrator 9 through a double-pole switch 23 when the movable contact of the switch is in the position a. The output of the AND gate 19 is connected to the input of the monostable multivibrator 17 and the output of the AND gate 21 is connected to one of the three inputs of an OR gate 22, whose other two inputs are connected respectively to the output $\overline{Q}$ of the monostable multivibrator 17 and to the output of the AND gate 13.

The circuit further comprises an auxiliary circuit for the purpose of increasing the intensity of the current pulse under short circuit conditions, such as to melt away the metallic bridge between the electrodes which causes the short circuit. The auxiliary circuit comprises a current source 24 and a transistor 25 whose emitter-collector circuit is connected between the current source 24 and the limiting resistor 6. The conducting state of the transistor 25 is controlled by its base from the output of an AND gate 26 through a switch 27, one of the inputs of the AND gate 26 being connected to the output $\overline{Q}$ of the monostable multivibrator 14. A diode 28 is connected in series in the main circuit which includes the main power supply 4 and the transistor 5, such as to prevent current from the auxiliary source 24 from flowing into the main pulse generator circuit.

In the absence of short circuits, no signal appears at the output Q of the Schmitt trigger 12 at the moment at which an electric discharge begins, and the flip-flop 18 is set such that the signal at its output Q inhibits the AND gate 19 and the signal at its output $\overline{Q}$ enables the AND gate 20 to pass the signal at the output of the Schmitt trigger 11 to the input of the monostable multivibrator 9, while simultaneously enabling the AND gate 21 to supply to the input of the monostable multivibrator 7 the signal appearing at the output $\overline{Q}$ of the monostable multivibrator 9. Under those conditions, the pulses across the machining zone are controlled in such manner as to hold each discharge during a time interval determined by the monostable multivibrator 9, and to introduce between two consecutive voltage pulses a cut-off time interval determined by the monostable multivibrator 7.

When a short circuit is detected by the Schmitt trigger 12 at the beginning of a pulse, the output Q of the Schmitt trigger 12 resets the flip-flop 18, thus providing a signal at the output $\overline{Q}$ of the flip-flop, which inhibits the AND gates 20 and 21, while the signal at the output Q of the flip-flop is applied to the input of the AND gate 19. If the short circuit disappears in the course of the current pulse, the AND gates 20 and 21 remain inhibited, and the output $\overline{Q}$ of the flip-flop provides a signal on the other input of the AND gate 19 which is transferred through the AND gate 19 to the input of the monostable multivibrator 17. After a predetermined time interval, a signal appears at the output Q of the monostable multivibrator 17, said output signal being applied to the input of the monostable multivibrator 7 to cut off the pulse at the end of the time interval. In such manner, the duration of the electrical discharge is extended for a predetermined time interval from the moment at which the short circuit disappears. At the onset of a pulse in the presence of a short circuit, the output $\overline{Q}$ of the flip-flop 18 provides a signal changing the state of the monostable multivibrator 14 but, when the short circuit disappears, the signal at the output Q of the Schmitt trigger 12 inhibits the AND gate 13 and the signal at the output $\overline{Q}$ of the monostable multivibrator 14 is blocked and cannot reach the input of the monostable multivibrator 7. On the other hand, if the short circuit is still present when the monostable multivibrator 14 returns to its stable state, the signal at its output $\overline{Q}$ is applied to the input of the monostable multivibrator 7, which in turn causes the current pulse to be cut off. Thus, the duration of the pulse during a short circuit cannot exceed the time interval determined by the monostable multivibrator 14.

If it is desired to accelerate the melting or burning off of the metallic bridge causing the short circuits, the switch 27 is closed, and the signal at the output Q of the monostable multivibrator 14 is applied to one of the inputs of the AND gate 26, the other input of the AND gate 26 receiving the signal appearing at the output Q of the Schmitt trigger 12. The base of the transistor 25 is biased to conductance, thus closing the auxiliary circuit and causing a current pulse of high intensity to flow through the machining zone 3. This high intensity pulse is cut off by the signal appearing at the output of the AND gate 26 as soon as the short circuit disappears. This arrangement can also function when the double-pole switch 23 is placed on the position b connecting directly the input of the monostable multivibrator 9 to the output Q of the monostable multivibrator 7. In such a mode of operation, the voltage pulses have a constant duration in the absence of a short circuit.

The new process of the invention may also be practiced by means of pulse generator circuits other than those specifically described and illustrated, for example, by means of circuits in which the monostable multivibrators of FIGS. 1 and 3 are replaced by digital circuits comprising pulse counters. The process of the invention can also be modified by varying the duration of the extension of the current pulses beyond the disappearance of a short circuit, as a function of the voltage level of the electrical discharges such as to obtain discharges of equal energy, or yet by varying the duration of the extension of the current pulses as a function of the machining current level, such as to maintain constant the quantum of current energy during each discharge. In addition, other means for detecting short circuits may be used, such as for example means based on measuring the impedance of the machining zone according to known systems.

I claim:

1. A process for machining by EDM an electrode workpiece by means of an electrode tool, wherein consecutive voltage pulses are applied across the electrodes for triggering machining electrical discharges, such voltage pulses being supplied by a DC current source connected across the electrodes during an "on" time interval and disconnected from across the electrodes during an "off" time interval, said process comprising disconnecting said electrodes from across said current source after a predetermined time interval following the beginning of a machining discharge, monitoring the appearance of a short circuit in the machining zone between said electrodes in the course of said "on" time interval, controlling the start of said predetermined time interval from the moment at which said short circuit disappears after appearing during said "on" time interval, and limiting the duration of said "on" time interval to a predetermined duration when a short circuit is continuously detected during said "on" time interval.

2. The process of claim 1 further comprising increasing current intensity during said "on" time interval when a short circuit is detected during said "on" time interval.

3. An apparatus for machining by EDM and electrode workpiece by means of an electrode tool comprising means for successively connecting and disconnecting said electrodes across a source of DC current for applying across a machining zone between said electrodes consecutive voltage pulses for triggering machining electrical discharges, means connecting said electrodes across said source of DC current during an "on" time interval, means disconnecting said electrodes during an "off" time interval from across said source after a predetermined time interval following the beginning of said discharge, means for maintaining said "off" time interval to a constant predetermined duration, means for establishing the duration of said predetermined time interval, said last mentioned means being controlled by a first electrical signal indicating the beginning of a machining electrical discharge, means for detecting the presence of a short circuit in said machining zone and for detecting the disappearance of said short circuit during said "on" time interval, means for initiating said predetermined time interval upon disappearance of said circuit, and means for limiting the duration of said "on" time interval to a predetermined duration upon continuous detection of a short circuit during said "on" time interval.

4. The apparatus of claim 3 wherein the means for detecting the presence of a short circuit comprises means for establishing a reference voltage and means for comparing said reference voltage with the voltage across the electrodes whereby said reference voltage being higher than said voltage across the electrodes indicates the presence of said short circuit and said reference voltage being lower than said voltage across the electrodes indicates the absence of said short circuit.

5. The apparatus of claim 4 further comprising means for increasing current intensity during said "on" time interval upon detection of a short circuit during said "on" time interval.

6. The apparatus of claim 3 further comprising means for increasing current intensity during said "on" time interval upon detection of a short circuit during said "on" time interval.

* * * * *